US005299181A

United States Patent [19]

Koguchi

[11] Patent Number: 5,299,181

[45] **Date of Patent: * Mar. 29, 1994**

[54] AUTO-PLAYING APPARATUS

[75] Inventor: Satoru Koguchi, Tokyo, Japan

[73] Assignee: Casio Computer Co., Ltd., Tokyo, Japan

[*] Notice: The portion of the term of this patent subsequent to Sep. 15, 2009 has been disclaimed.

[21] Appl. No.: 894,847

[22] Filed: Jun. 5, 1992

Related U.S. Application Data

[63] Continuation of Ser. No. 574,694, Aug. 28, 1990, Pat. No. 5,148,419.

[30] Foreign Application Priority Data

Sep. 4, 1989 [JP] Japan .............................. 1-228678

[51] Int. Cl.[5] .............................. G11B 7/00

[52] U.S. Cl. .............................. 369/32

[58] Field of Search .............. 369/32, 33, 48, 49, 369/50; 358/341, 342, 343; 364/419; 84/609, 610, 615, 616, 634, 645, 453

[56] References Cited

U.S. PATENT DOCUMENTS 4,355,559 10/1982 Uya et al. .
4,587,635 5/1986 Hashimoto et al. .............. 364/419
4,624,171 11/1986 Yuzawa et al. .
4,758,908 7/1988 James .............................. 360/61
4,833,549 5/1989 Yoshimoto et al. .
4,839,733 6/1989 Karamon et al. .................. 360/61
4,960,030 10/1990 Fujimori .............................. 84/609
5,070,758 12/1991 Hatada et al. ...................... 84/610
5,138,925 8/1992 Koguchi et al. .................... 84/609
5,148,419 9/1992 Koguchi .............................. 369/32
5,189,237 2/1993 Koguchi .............................. 84/609

FOREIGN PATENT DOCUMENTS 0137758 9/1984 European Pat. Off. .
0303700 2/1988 European Pat. Off. .
62-146470 6/1987 Japan .
62-138361 9/1987 Japan .
1-25078 5/1989 Japan .
1-199385 8/1989 Japan .

*Primary Examiner*—Donald E. McElheny, Jr.
*Attorney, Agent, or Firm*—Frishauf, Holtz, Goodman & Woodward

[57] ABSTRACT

A recording medium records performance data of a predetermined program piece. The recording medium is played back as a background performance, and auto-playing data is sequentially stored in synchronism with the playback operation of the recording medium program number data of the recording medium and present playback time data at the beginning of the storage operation are fetched from the recording medium, and are stored in a memory. For this reason, when the stored data is automatically played, the corresponding program piece of the recording medium can be automatically selected, and an auto-play can be synchronously started at the same timing as in a storage mode.

11 Claims, 8 Drawing Sheets

| | Q1 Q2 Q3 Q4 | Q5 Q6 Q7 Q8 | Q9 Q10 Q11 Q12 Q13 Q14 Q15 Q16 | |
|---|---|---|---|---|
| | FLAG | 0 0 0 1 | 0 0 0 0 0 0 0 0 | |
| Q17 | POINT | | RUNNING TIME (MINUTES) | Q32 |
| Q33 | RUNNING TIME (SECOND) | | RUNNING TIME (FRAME NO.) | Q48 |
| Q49 | 0 0 0 0 0 0 0 0 | | ABSOLUTE TIME (MINUTES) | Q64 |
| Q65 | ABSOLUTE TIME (SECOND) | | ABSOLUTE TIME (FRAME NO.) | Q80 |
| Q81 | ERROR DETECTION CODE (CRC CODE) | | | Q96 |

FIG.5

| | Q1 Q2 Q3 Q4 | Q5 Q6 Q7 Q8 | Q9 Q10 Q11 Q12 Q13 Q14 Q15 Q16 | |
|---|---|---|---|---|
| | FLAG | 0 0 0 1 | TRACK NO. | |
| Q17 | INDEX | | RUNNING TIME (MINUTES) | Q32 |
| Q33 | RUNNING TIME (SECOND) | | RUNNING TIME (FRAME NO.) | Q48 |
| Q49 | 0 0 0 0 0 0 0 0 | | ABSOLUTE TIME (MINUTES) | Q64 |
| Q65 | ABSOLUTE TIME (SECOND) | | ABSOLUTE TIME (FRAME NO.) | Q80 |
| Q81 | ERROR DETECTION CODE (CRC) | | | Q96 |

FIG.6

AUTO-PLAYING APPARATUS

This application is a continuation of Ser. No. 07/574,694 filed on Aug. 28, 1990, now U.S. Pat. No. 5,148,419.

BACKGROUND OF THE INVENTION

1. Field of the Invention

The present invention relates to an auto-playing apparatus which can synchronously perform reproduction of audio data and an auto-play based on auto-playing data using a recording medium for recording the audio data and a memory means for storing the auto-playing data.

2. Description of the Related Art

In an auto-playing apparatus in an electronic musical instrument, pitch and duration data corresponding to notes of a music piece are stored in a semiconductor memory according to the progress of the music piece. The pitch and duration data are read out from the semiconductor memory and are supplied to a sound source circuit, so that the music piece can be automatically played back as it is stored. Such auto-playing apparatuses have always been proposed, and many commercially available electronic musical instruments have such functions. A technique about an auto-playing apparatus of this type is disclosed in detail in, e.g., U.S. Pat. No. 4,624,171 by Yuzawa et al.

When a playing technique of an electronic musical instrument is to be learned, the auto-playing apparatus can exhibit great practical effects. That is, a player (or operator) can store key operation signals played by himself or herself as auto-playing data, and can cause the auto-playing apparatus to perform an auto-play based on the stored auto-playing data, so that he or she can objectively judge his or her performance.

In general, a music piece is as a combination of parts of a plurality of kinds of instruments played by the plurality of kinds of instruments. When a specific one of the plurality of instrument parts is to be played, if a music piece including the overall parts are played back as a background music, a learning effect can be improved. That is, if a player plays his part while listening to the music piece played back as the background music, he can easily recognize a timing of a melody part to be played by him.

A music piece to be played back as a background music can be easily obtained by playing back an analog disk or a compact disk (CD) by a disk or CD player. It is more effective to use an analog disk or a CD recorded in a "minus-one" format. The "minus-one" analog disk or CD is manufactured especially for a person who learns, e.g., a piano, and records a piano concerto excluding a piano part. Thus, a player plays his or her instrument while playing back a music piece recorded in the "minus-one" format.

In this case, a learning effect can be improved if his or her playing data is stored using the auto-playing apparatus and the stored data is played back. In the auto-playing mode, however, the "minus-one" recording medium, the analog disk or CD must be played back in advance, and the auto-playing apparatus must be started at proper time corresponding to the beginning of his or her part.

If the player fails to start manually the auto-playing apparatus at a predetermined timing, the played back tones cannot be synchronous with the auto-play.

SUMMARY OF THE INVENTION

It is an object of the present invention to reliably synchronize a playback operation of a recording medium and that of an auto-play.

In order to achieve the above object, according to the present invention, there is provided an auto-playing apparatus comprising:

input means for inputting auto-playing data;

memory means, connected to the input means, for storing the auto-playing data input by the input means;

auto-playing means, connected to the memory means, for reading out the auto-playing data from the memory means to sequentially generate corresponding musical tone signals, thereby performing an auto-play operation;

setting means for setting a storage mode for storing the auto-playing data in the memory means;

instruction means for instructing start of an auto-playing operation;

a recording medium for recording audio data;

reproduction means, connected to the recording medium, for reproducing the audio data from the recording medium;

detection means, connected to the reproduction means, for detecting position data associated with a present reproduction position of the recording medium which is being reproduced by the reproduction means;

control means, connected to the auto-playing means, the reproduction means, and the detection means, for executing (i) a control operation for, when the storage mode is set by the setting means, fetching the position data associated with the present reproduction position of the recording medium when input of the auto-playing data is started at the input means from the detection means, and causing the memory means to store the position data, (ii) a control operation for, when the storage mode is set by the setting means, causing the memory means to store auto-playing data sequentially input by the input means, (iii) a control operation for, when the instruction means instructs to start the auto-playing operation, reading out the position data from the memory means, comparing the readout position data with present position data of the recording medium which is detected by the detection means, sequentially reading out the auto-playing data from the memory means when a coincidence between the two data is detected, and causing the auto-playing means to start the auto-play operation.

Thus, a playback operation of a recording medium and that of an auto-play can be reliably synchronized with each other. Therefore, a start timing of a melody to be played in a flow of the entire music piece or an image of the entire music piece can be easily recognized, thus obtaining advantages as a training apparatus.

The above and other objects and effects of the present invention will become apparent from the following description of the embodiments taken in conjunction with the accompanying drawings.

BRIEF DESCRIPTION OF THE DRAWINGS

FIG. 5 shows contents of a control bit Q in a lead-in area of the compact disk;

FIG. 6 shows contents of the control bit Q in a program area of the compact disk;

DETAILED DESCRIPTION OF THE PREFERRED EMBODIMENTS

Preferred embodiments of the present invention will now be described with reference to the accompanying drawings.

Figure 1:
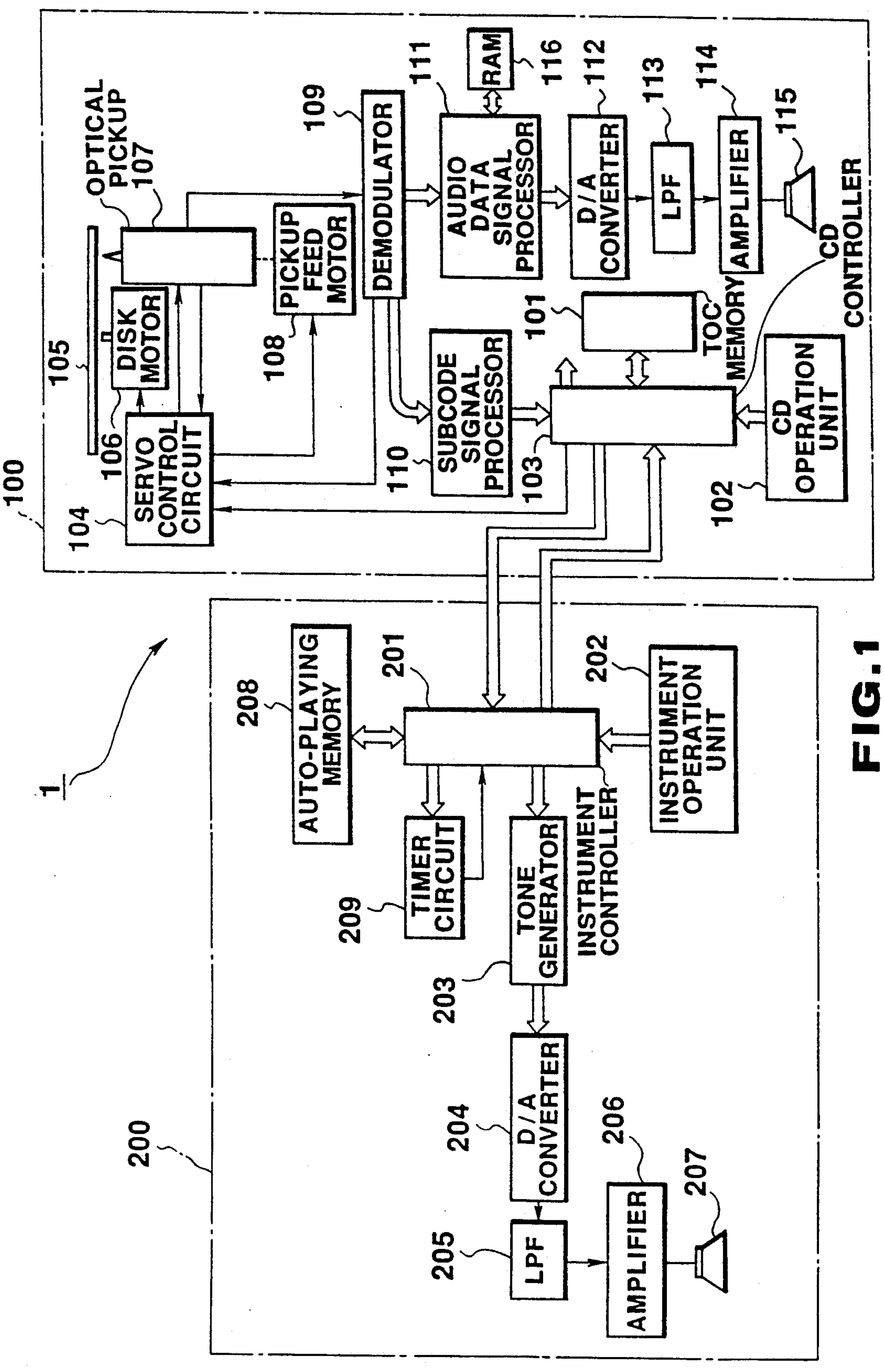
FIG. 1 is a block diagram showing the overall arrangement of an auto-playing apparatus.
Figure 2:
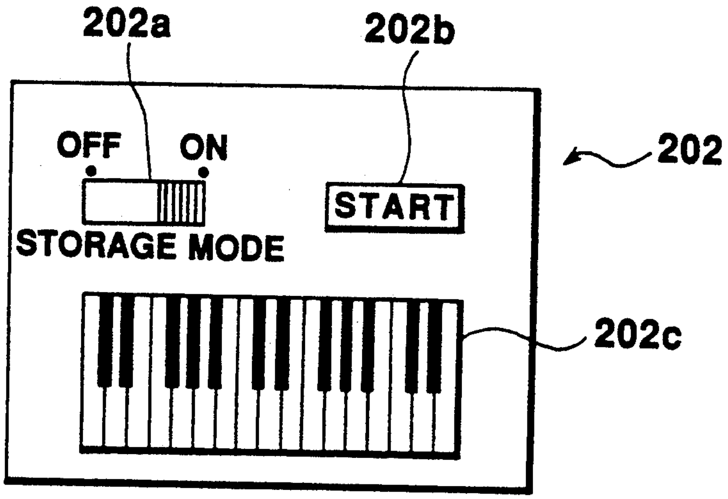
FIG. 2 is a plan view showing in detail an instrument operation unit.

Arrangement ( FIG. 1 is a block diagram showing the overall arrangement of an auto-playing apparatus 1 comprising an electronic keyboard instrument and a CD (compact disk) player according to the first embodiment of the present invention.

In FIG. 1, a portion enclosed by an alternate long and short dashed line 100 is a CD player section, and a portion enclosed by an alternate long and short dashed line 200 is an electronic keyboard instrument section.

The block arrangement of the CD player section 100 will be described first.

Reference numeral 105 denotes a CD which is set on a holder portion (not shown) of the CD player section 100. The CD player section 100 of this embodiment is used to play back commercially available CDs. A particularly preferable CD in this embodiment is one in which music pieces are recorded in the "minus-one" format. The "minus-one" CD is exemplified by a CD which records audio data such as a piano concerto excluding a piano part.

A TOC memory 101 stores TOC (Table of Contents) data in a lead-in area which is automatically read when the CD 105 is set in the CD player section 100. The TOC data will be described later.

Reference numeral 102 denotes a CD operation unit which has a play switch, a stop switch, a pause switch, music selection switches for directly selecting an arbitrary music piece, and the like, which are provided to a conventional CD player, although not shown.

A CD controller 103 comprises, e.g., a microprocessor, and controls the entire CD player section 100. The CD controller 103 exchanges various data among a subcode signal processor 110, an instrument controller 201, the TOC memory 101, and the like. The CD controller 103 outputs a drive control signal to a servo control circuit 104 when the circuit 104 drives the CD 105.

The servo control circuit 104 controls the rotational speed of a disk motor 106 for rotating the CD 105, so that a linear velocity of a track of the CD 105 becomes constant.

The servo control circuit 104 performs focus servo and tracking servo of an optical pickup 107 for radiating a laser beam onto the track of the CD 105. In the focus servo, a focus error is detected on the basis of a state of reflected light of the laser beam, and an objective lens in the optical pickup 107 is driven in an optical axis direction. In the tracking servo, the optical pickup 107 is radially moved by a pickup feed motor 108 while detecting an offset of the laser beam from the center of the track of the CD 105, and for a very small offset caused by an eccentricity of a disk, an internal lens itself of the optical pickup 107 is moved to follow the track, so that the laser beam emitted from the optical pickup 107 can be accurately radiated on the center of the track of the CD 105.

Projections or recesses called pits are formed on the laser beam radiation surface of the CD 105. With these pits, PCM signals (Pulse Code Modulation signals) are recorded. The optical pickup 107 detects the presence/absence of pits on the basis of an amount of reflected light of the radiated laser beam, and outputs electrical signals corresponding to the presence/absence of the pits and their lengths to a demodulator 109.

The demodulator 109 detects a frame sync signal from the electrical signals output from the optical pickup 107 to identify divisions of symbol words, and EFM (Eight to Fourteen Modulation)-demodulates EFM-modulated 14-bit symbol words in each frame to convert them into 8-bit symbol words of the EFM-demodulated symbol words, those including audio data are output to an audio data signal processor ill, and those including subcodes are output to the subcode signal processor 110.

The audio data signal processor 111 writes the input audio data in a RAM (Random Access Memory) 116, performs error correction processing based on Reed-Solomon codes, and performs deinterleave processing to decode 16-bit digital audio data in units of frames. The processor 111 outputs the digital audio data to a D/A (Digital-to-Analog) converter 112.

The D/A converter 112 converts the input digital audio data into analog audio signals, and outputs the analog audio signals. The analog audio signals are supplied to an amplifier 114 and a loudspeaker 115 via an LPF (Low-Pass Filter) 113 having a cutoff frequency ½ a sampling frequency, and are then produced as sounds.

The subcode signal processor 110 performs error detection & correction processing and deinterleave processing of 8-bit subcodes to decode the subcodes. Of the decoded subcodes, two control bits P and Q are output to the CD controller 103. The control bits P and Q will be described later.

The block arrangement of the electronic keyboard instrument section 200 will be described below.

An instrument operation unit 202 is provided with a mode switch 202*a*, a start switch 202*b*, a playing keyboard 202*c*, and the like. The mode switch 202*a* is turned on in a storage mode in which auto-playing data (to be described later) necessary for an auto-play is written in a memory, and is turned off in a play mode in which the stored auto-playing data are read out to perform an auto-play or the keyboard is manually played. The start switch 202*b* is used to start the auto-play.

An instrument controller 201 comprises, e.g., a microprocessor, and monitors operation states of various keys of the instrument operation unit 202 at predetermined time intervals. In the storage mode, the controller 201 stores auto-playing data such as pitch data and duration data obtained from an operated or depressed key on the keyboard 202*c* or tone color data designated by a tone color switch (not shown) in an auto-playing memory 208 comprising a RAM. In the play mode, playing data of the keyboard 202c is directly supplied to a tone generator 203. When the start switch 202b is operated in the play mode, the auto-playing data read out from the auto-playing memory 208 is supplied to the tone generator 203 as the playing data.

The tone generator 203 generates musical tone signals on the basis of the playing data. The musical tone signals are input to a D/A converter 204.

The musical tone signals are converted into analog waveform signals by the D/A converter 204 and an LPF 205. The conversion outputs are produced as sounds via an amplifier 206 and a loudspeaker 207.

A timer circuit 209 includes a time counter, a duration data buffer, a comparator, and the like although not shown, and measures a period of time corresponding to duration data when an auto-play is performed by reading out auto-playing data from the auto-playing memory 208.

CD Recording Format

A recording format of digital data in the CD 105 will be described below.

Figure 3:
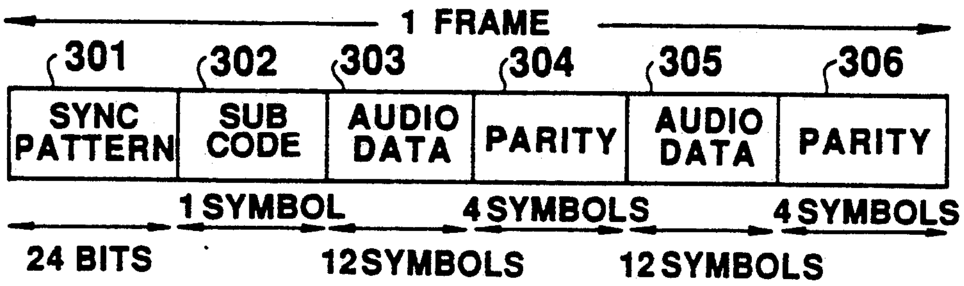
FIG. 3 shows a frame format of a compact disk.

As shown in FIG. 3, digital data is recorded in units of so-called frames. In each frame, a 24-channel bit sync pattern (synchronize pattern) 301, a subcode 302 for one symbol, audio data 303 for 12 symbols, parity words 304 for four symbols, audio data 305 for 12 symbols, and parity words 306 for four symbols are allocated.

In the data string in the above-mentioned frame format, one symbol in FIG. 3 is constituted by 8-bit data prior to EFM modulation on the other hand, audio data to be recorded on the CD 105 is digital data each sample of which is sampled at a sampling frequency of 44.1 kHz, and is quantized by 16 bits. Therefore, one sample is expressed by two symbols. As described above, since the audio data 303 and 305 for a total of 24 symbols are recorded in one frame shown in FIG. 3, this means that audio data for a total of 12 samples is recorded in one frame. The parity words 304 and 306 are those called CIRCs (Cross Interleave Reed-Solomon Codes).

Figure 4:
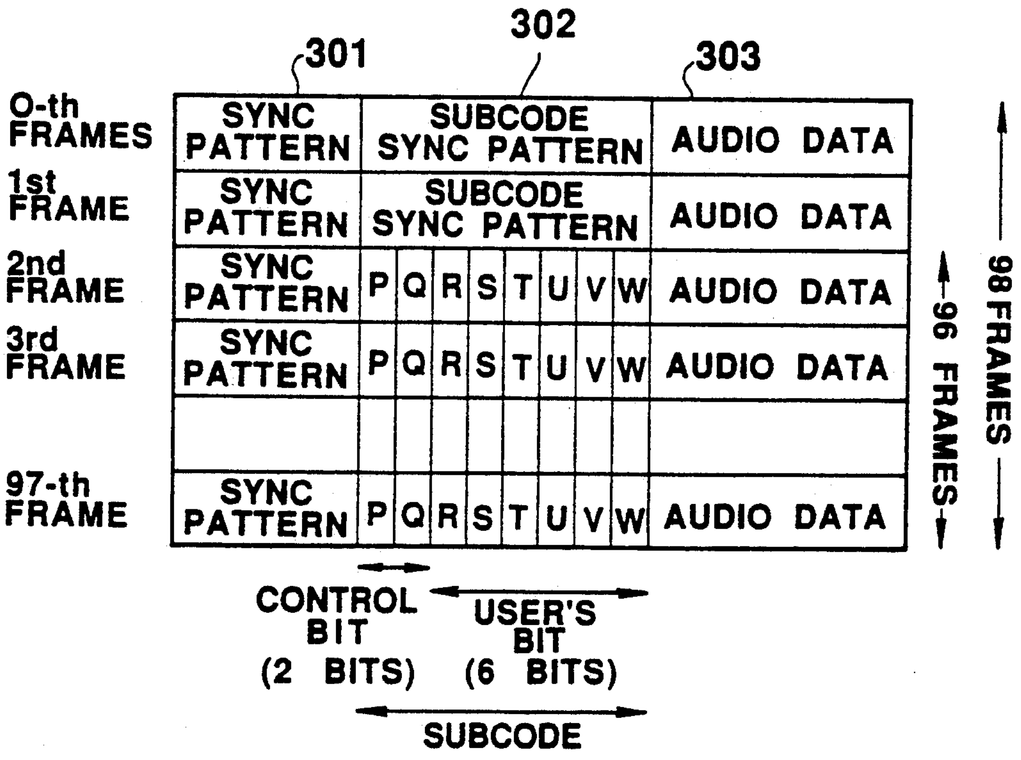
FIG. 4 shows a format of a subcoding frame of the compact disk.

FIG. 4 shows a data format about the subcode 302. Of the 8-bit subcode 302 per frame, respective bits are called P, Q, R, S, T, U, V, and W. As shown in FIG. 4, 8-bit subcodes are combined so that 98 frames constitute one subcoding frame of the 98 frames, the 8-bit subcodes in the 0th and 1st frames serve as sync patterns for the subcoding frame. The sync patterns serve as subcoding frame recognition patterns so that the subcode signal processor 110 identifies subcodes P to W in the 2nd to 97th frames.

The bits P and Q in the 2nd to 97th frames are control bits, and are used for system control. The bits R to W are user's bits and are used to record data such as a still image. However, these user's bits are not used in the present invention, and a detailed description thereof will be omitted.

Figure 7:
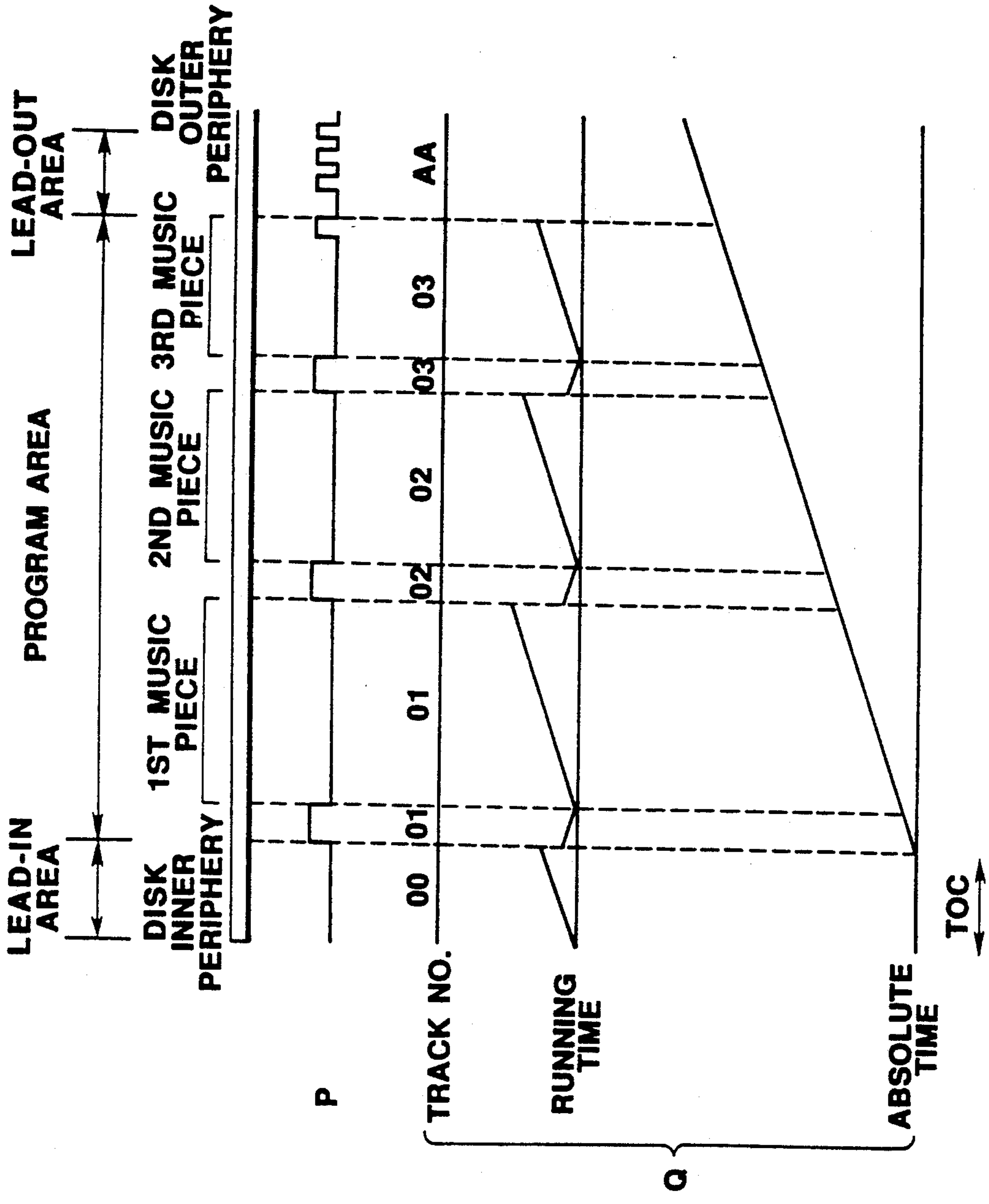
FIG. 7 shows a recording content of the compact disk.

The roles of the control bits P and Q will be described below with reference to a CD which records three music pieces, as shown in FIG. 7. As shown in FIG. 7, various data are recorded in a CD from an inner periphery toward an outer periphery. An innermost peripheral area of the disk (an area having a diameter range of 46 to 50 mm) is called a lead-in area of data recorded in the lead-in area in units of frames described above with reference to FIG. 3, the control bits Q in the subcodes are used to record so-called TOC (Table of Contents) data corresponding to a table of contents of all the music pieces recorded in one CD.

The control bits Q in TOC data for one music piece will be described below with reference to FIG. 5.

In FIG. 5, $Q_1, Q_2, \ldots, Q_{96}$ correspond to the control bits Q in the 2nd, 3rd, . . . , 97th frames shown in FIG. 4.

Flags in the bits $Q_1$ to $Q_4$ are used to identify the number of channels of audio data, and the presence/absence of an emphasis mode. The next four bits $Q_5$ to $Q_8$ are set to indicate "1", and the next eight bits $Q_9$ to $Q_{16}$ are all "0"s. The next eight bits $Q_{17}$ to $Q_{24}$ represent point data, i.e., data associated with a track No. (music No.). The following three sets of eight bits $Q_{25}$ to $Q_{32}$, $Q_{33}$ to $Q_{40}$, $Q_{41}$ to $Q_{48}$ represent minute, second, and frame number data (to be described later) of a running time, which are increased up to an end time of the lead-in area to have a start time of the lead-in area as "0". These data are used in an internal system but are not particularly externally displayed.

The next eight bits (from Q49) are all "0"s, and the following three sets of eight bits (up to Q80) represent minute, second, and frame No. data of an absolute time. Using these three sets of time data, a start time of each music piece in a program area corresponding to the point data (music No.) is expressed as a lapse time from the staft time of the program area. For example, if a CD records three music pieces, as shown in FIG. 7, absolute time data of the start points of the music pieces for points 01, 02, and 03 are recorded.

The last 16 bits define an error detection code (CRCC code). The CRCC is an abbreviation of Cyclic Redundancy Check Code, which is a kind of error correction code for dividing data bits by a predetermined constant and using a remainder as check bits.

In the program area following the lead-in area, audio data is recorded in units of frames shown in FIG. 3. The control bits P and Q in the subcode of this frame are recorded, as shown in FIG. 7. The control bit P is data representing the presence or interval of music pieces, and is set to be "1" when the frame corresponds to an interval between music pieces and does not include the audio data 303 and 305 (FIG. 3); it is set to be "0" when the frame corresponds to the duration of a certain music piece to represent the presence of audio data.

Various time data shown in FIG. 6 are recorded based on the control bits Q. Subcodes are processed in units of 98 frames (one frame time is 136.05 psec.) as one subcoding frame, as has been described with reference to FIG. 4. Therefore, one subcoding frame time (136.05 $\mu$sec.×98), i.e., time data in units of 1/75 sec. can be recorded by the control bits Q.

In FIG. 6, the first and next four bits are the same as those in the bits Q in the TOC data described above with reference to FIG. 5. The next eight bits following $Q_9$ represent a track No. (music No.). The next eight bits represent an index obtained by further segmenting a track No.. The following three sets of eight bits represent a running time. A lapse time from a start time of each music piece is expressed by minutes, seconds, and a frame No., and its display is updated in units of 1/75 sec. The next eight bits are all "0"s. The next three sets of eight bits represent an absolute time (minutes, second and frame No.), and express a lapse time from the start time of the program area to the time of the corresponding subcoding frame on the order of 1/75 sec like in the TOC data described above with reference to FIG. 5. The last 16 bits define an error detection code (CRCC code).

As described above with reference to FIG. 4, 98 frames of subcodes form one subcoding frame, and one subcoding frame corresponds to 1/75 sec. Therefore, a series of data for 75 subcoding frames become the same second data.

Subcoding frame Nos. are obtained by numbering the 75 subcoding frames in the same second data from 0 to 74 in turn, and are named simply as the above-mentioned frame Nos.

In this manner, when all the TOC data (FIG. 5) is read, the absolute time data of the start time of each music piece corresponding to the music No. can be detected in units of subcoding frames, i.e., on the order of 1/75 sec.

For this reason, as will be described later, when the CD controller 103 shown in FIG. 1 accesses audio data of each music piece recorded on the CD 105, it reads the TOC data to accurately access the start position of the audio data of an arbitrary music piece.

Operation

The auto-playing apparatus 1 of this embodiment is first set in the storage mode, a desired music piece of a CD is played back, and the keyboard 202*c* is operated like in actual performance in correspondence with CD playback tones, thereby sequentially storing auto-playing data. When an auto-play is instructed to start after the auto-playing data is stored in this manner, the same music piece of the CD played back as a back-ground music during recording of the auto-playing data is automatically selected, and the selected music piece of the CD begins to be played back. Then, the auto-play is started at the same timing as the start timing of performance in the storage mode. For example, when a piano part of a piano concerto is to be automatically played back, a "minus-one" CD which records the concerto except for the piano part is adopted, and the piano part is performed and stored as the auto-playing data.

Figure 8:
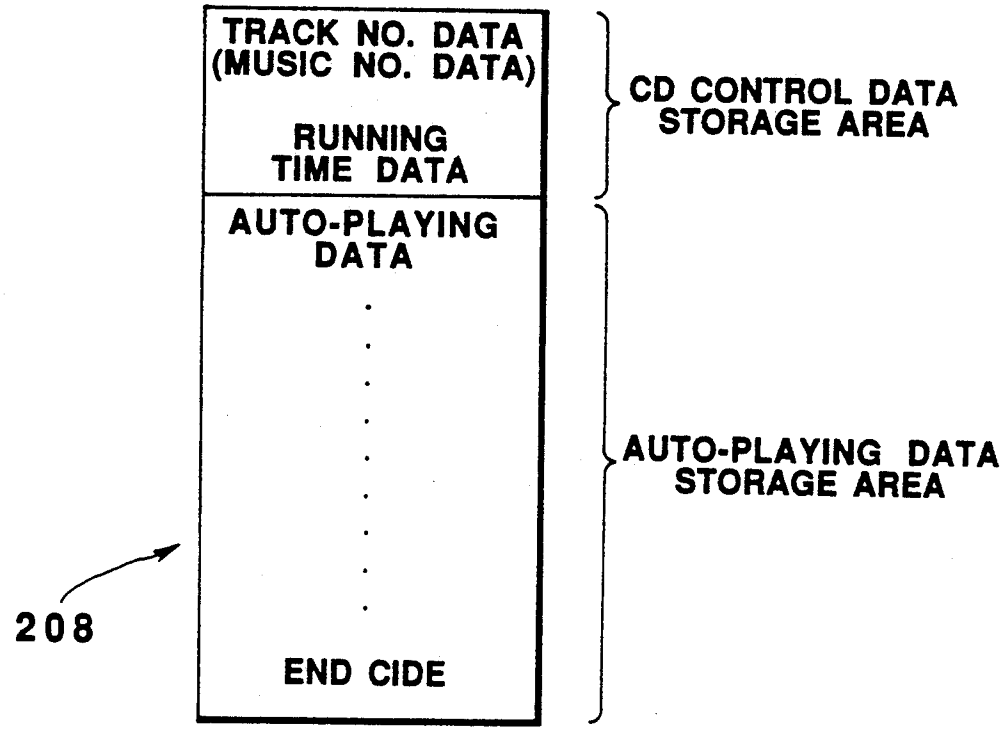
FIG. 8 shows a data storage state of an auto-playing memory.
Figure 9:
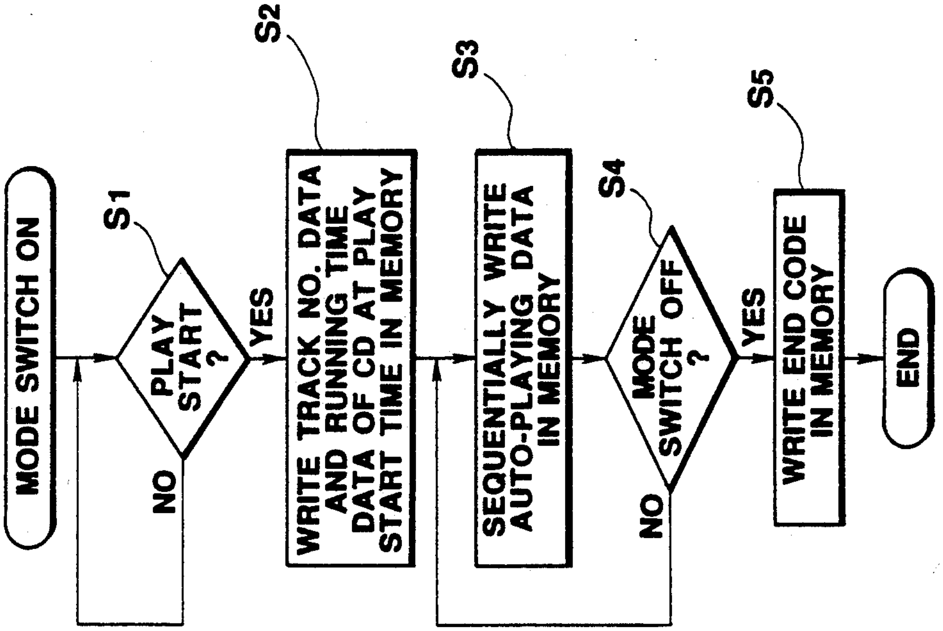
FIG. 9 is a flow chart showing a storage operation of auto-playing data.

The operation will be described in detail below with reference to FIGS. 8 to 10.

An operation for storing the auto-playing data in the auto-playing memory 208 will be described below. The storage operation is executed in the storage mode which is set by turning on the mode switch 202*a*. When the mode switch 202*a* is turned on, the instrument controller 201 detects it, and executes control operations in steps $S_1$ to $S_5$ shown in FIG. 9. when an auto-play is to be performed in synchronism with a music piece played back from the CD, a CD which records a desired music piece is set in the holder portion, the desired music piece is selected, and the PLAY switch of the CD operation unit 102 is pressed to play back the CD.

When a user sets the CD in the holder portion, the CD controller 103 detects it using microswitches (not shown), and performs a control operation for reading the TOC data recorded in the lead-in area of the CD. This operation is normally performed by all the commercially available CD players, more specifically, when the CD controller 103 detects that the CD is set, the CD is rotated, and only data in the lead-in area is read by the optical pickup 107. Thereafter, the CD is automatically stopped. In the lead-in area, the TOC data is recorded by control bits Q in subcodes, as has been described above with reference to FIG. 7. When the reproduced subcodes are sequentially supplied to the subcode signal processor 110, the subcode signal processor 110 constructs the control bits Q in the subcodes in the format shown in FIG. 5, detects "POINT" data (music Nos.) and the absolute time data corresponding to start times of music pieces, and outputs these data to the CD controller 103. The CD controller 103 outputs the input data to the TOC memory 101 to cause it to store the absolute time data corresponding to the start times of the music pieces in units of POINT data (music Nos.). The storage content of the TOC memory 101 is used as data for selecting music pieces of the CD.

The user then inputs the music No. of the desired music piece in the set CD at the CD operation unit 102, and then depresses the PLAY switch. The CD controller 103 controls the servo control circuit 104 to rotate the CD, and reads out the absolute time data of the start time of the "POINT" data corresponding to the input music No. from the TOC memory 101. The controller 103 then moves the optical pickup 107 to a position of the readout absolute time data, and starts a playback operation of the CD from the beginning of the corresponding music piece. In the CD playback state, the subcode signal processor 110 constructs control bits Q in the reproduced subcodes in the format shown in FIG. 6, detects time data corresponding to the present position of the CD which is being played back (running time data & absolute time data), and track No. data corresponding to the present music piece, and outputs these data to the CD controller 103. The CD controller 103 sends the running time data and the track No. data of the input data to the instrument controller 201.

The user starts to play the keyboard 202*c* at a timing to be automatically played while listening to the music piece played back from the CD and produced from the loudspeaker 115, thereby sequentially inputting auto-playing data. When the instrument controller 201 detects that the play is started (step $S_1$ in FIG. 9), it fetches track No. data and running time data of the CD at the play start time, and writes them in the auto-playing memory 208 (step $S_2$). The auto-playing memory 208 has a CD control data storage area and an auto-playing data storage area, as shown in FIG. 8. The CD control data storage area stores the track No. data and the running time data at the play start time. The instrument controller 201 sequentially writes auto-playing data which is sequentially input from the keyboard 202*c* in the auto-playing data storage area of the auto-playing memory 208 (step $S_3$). The auto-playing data can have various formats used in conventional auto-playing apparatuses. For example, the auto-playing data may be a pair of pitch data of an ON key and duration data as a depression time of the key in units of key operations on the keyboard 202*c*. Alternatively, note-ON data and note No. data are assigned to the beginning of an ON event of a key, and note-OFF data and note No. data are assigned to an OFF event of the key. Every time any event, e.g., an ON or OFF event of a key is detected, time data from the previous event to the present event is assigned as event data. The auto-playing data may be formed by these data. Note that time data, e.g., the duration data, event data, and the like are measured by the timer circuit 209 (FIG. 1) and are used to auto-play.

In this manner, the user sequentially inputs auto-playing data at the keyboard 202*c* while listening to a music piece played back from the CD. When a melody part to be automatically played is completed, the user stops an operation of the keyboard 202*c*, and turns off the mode switch 202*a*. When the instrument controller 201 detects an OFF event of the mode switch 202*a* (step $S_4$), it ends a write operation of the auto-playing data, and writes an end code after the auto-playing data already written in the auto-playing data storage area of the auto-playing memory 208 (step $S_5$).

In this manner, the storage operation of the auto-playing data is performed. During the storage operation, corresponding musical tone signals are generated by the tone generator 203 in accordance with input performance of the auto-playing data at the keyboard 202*c*, and are produced as sounds from the loudspeaker 207. When only auto-playing data is input without playing back a CD, no write access of the CD control data area is performed, and hence, no synchronous playback operation of a CD is performed when the stored data is automatically played back.

An operation for reading out the stored auto-playing data and causing the apparatus to perform an auto-play will be described below. When the auto-playing data is stored while playing back a CD, the same music piece of the CD as in the storage mode is automatically selected in an auto-play mode without manually selecting and playing it back, and an auto-play is started at the same timing as in the storage mode.

Figure 10:
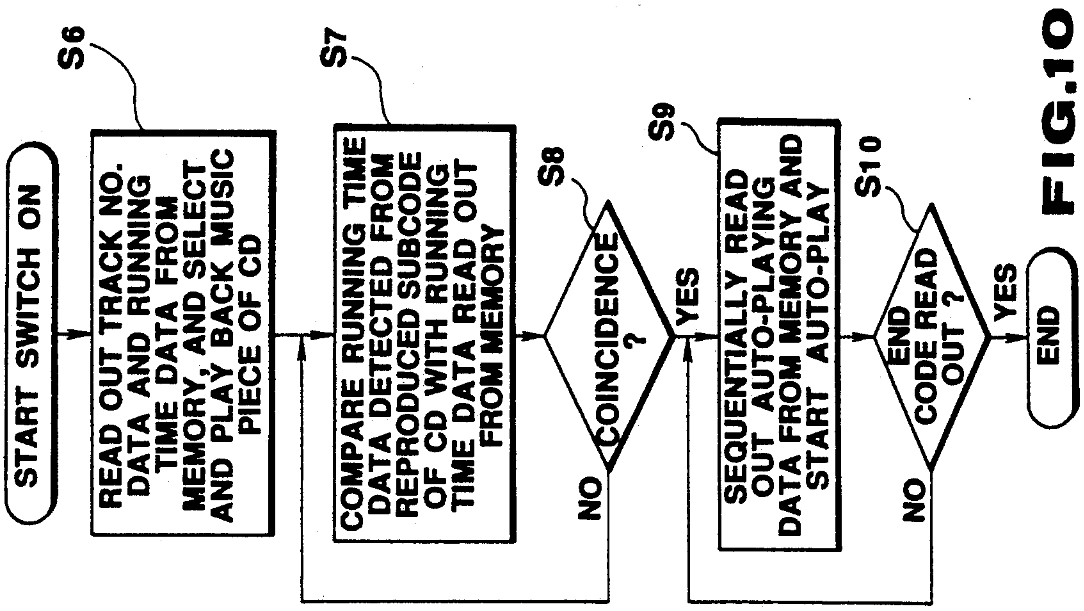
FIG. 10 is a flow chart showing an operation in an auto-playing mode.

The user sets the same CD as in the storage mode in the holder portion. When this CD is set, the TOC data is automatically read, and is stored in the TOC memory 101. This operation is executed as described above. The user then operates the start switch 202*b* while the mode switch 202*a* is kept OFF. When the instrument controller 201 detects the ON event of the start switch 202*b*, it starts control operations in steps S6 to S10 in FIG. 10.

when the instrument controller 201 detects the operation of the start switch 202*b*, it reads out the track No. data and the running time data from the CD control data storage area of the auto-playing memory 208, causes the CD player section to select a music piece of the CD which corresponds to the readout track No., and then performs control for playing back the selected music piece of the CD (step $S_6$ in FIG. 10). More specifically, the instrument controller 201 supplies the readout track No. data to the CD controller 103. The CD controller 103 searches and reads out the absolute time data having "POINT" data of a music No. coinciding with the input track No. data from the TOC memory 101, and accesses the CD based on the readout absolute time data. The absolute time data is one of the start time of the selected music piece of the CD, which was played back as the background music during a storage operation of the auto-playing data. The CD controller 103 starts a playback operation of the CD from the beginning of the accessed music piece. The instrument controller 201 stores the running time data read out from the auto-playing memory 208 in its internal register (not shown).

In the CD playback state, the subcode signal processor 110 constructs control bits Q in the reproduced subcodes into the format shown in FIG. 6, detects the time data corresponding to the present position of the CD which is being played back (running time data & absolute time data), and track No. data corresponding to the present music No., and sends these data to the CD controller 103. The CD controller 103 sends the running time data and the track No. data of these input data to the instrument controller 201. The instrument controller 201 compares the running time data of the music piece which is being played back, supplied from the CD controller 103 and the running time data stored in its internal register one by one (step $S_7$). When the running time data of the music piece which is being played back coincides with the running time data stored in the internal register (step $S_8$), the instrument controller 201 sequentially reads out the auto-playing data from the auto-playing memory 208 to start an auto-play (step $S_9$).

More specifically, a time from when the playback operation of the CD is started until the coincidence between the two data is detected is the same as a time from when the playback operation of the CD is started until the performance by a player is started. Since the auto-play is started when the coincidence is detected, the CD and the auto-play can be synchronously played back at the same timing as in the recording mode. The auto-playing operation is the same as that in a conventional apparatus. That is, the auto-playing data sequentially read out from the auto-playing data storage area of the auto-playing memory 208 are supplied to the tone generator 203, and the tone generator 203 generates the corresponding musical tone signals based on the input data, thereby producing corresponding tones from the loudspeaker 207. As for the time data (duration data or event data) of the auto-playing data, when a time corresponding to the time data is measured by the timer circuit 209, generation of a corresponding musical tone is stopped or the next data is read out.

In this manner, when the playback operation of the auto-playing data progresses, and all the auto-playing data of the corresponding music piece is read out from the memory 208, the end code is then read out when the instrument controller 201 detects that the readout code is the end code (step $S_{10}$), it ends a control operation for the auto-play. When the music piece which is being played back is ended, the CD controller 103 detects the end of the music piece based on the control bit P in the subcode, and stops rotation of the CD, thus completing the playback operation of the CD.

Another Embodiment

In the above embodiment, running time data of a music piece of a CD at a play start time is written in the auto-playing memory 208 in the storage mode. Time data measured by the timer circuit 209 may also be used in place of the running time data. More specifically, when the playback operation of the CD is started, the measurement operation of the timer circuit 209 is started. The measurement operation is stopped at the play start time, and the measured time data is used instead of the running time data when auto-playing data is played back, the obtained time data and the present running time data of the CD can be sequentially compared.

The same operation can be realized if the absolute time data is written in place of the running time data. That is, any data may be used as long as it is time data indicating a playback position of a CD (recording medium) at a play start time (an input start time of auto-playing data). The time data is equivalent to address data indicating a data recording position of a recording medium.

In the above embodiment, track No. data indicating a music No. of a CD at a play start time is written in the auto-playing memory 208 together with running time data in the storage mode, so that a music piece of the CD is automatically selected based on the track No. data when auto-playing data is played back. However, a music piece of a CD and its playback operation may be manually performed by a user, and a play start timing may be controlled based on only the running time data. In this case, the track No. data need not be written in the memory 208 in the storage mode.

Figure 11:
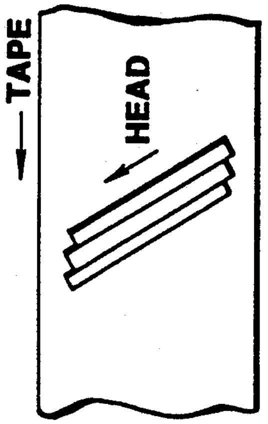
FIG. 11 shows a recording state of an R-DAT tape.
Figure 12:
FIG. 12 shows a track format of the R-DAT tape.
Figure 13:
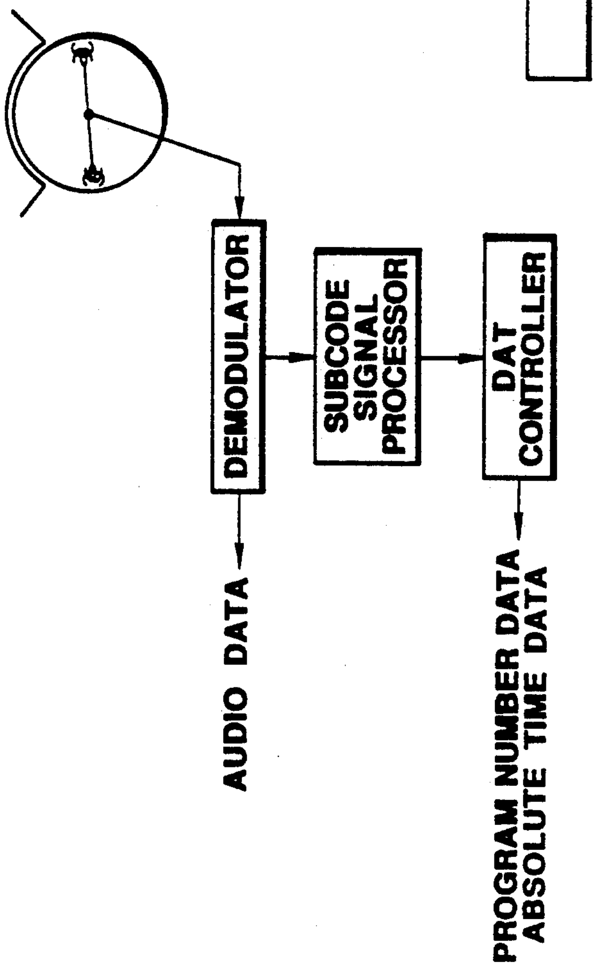
FIG. 13 is a partial block diagram of a playback circuit of the R-DAT tape.

As a recording medium, a magnetic tape of an R-DAT (Rotary Head Type Digital Audio Tape Recorder) may be used in place of the CD. In the R-DAT, a magnetic tape is wound around a rotary drum to which two rotary heads are attached like in a VCR (video Cassette Tape Recorder), thereby recording/reproducing digital data. FIG. 11 shows a state of a recording track on an R-DAT tape. A main area (PCM) for recording digital audio data is formed at the center of this recording track, and subareas (SUB-1 and SUB-2) for recording subcodes are formed on two sides of the main area, as shown in FIG. 12. The R-DAT tape is standardized such that program No., running time, and absolute time data are is recorded as subcodes like in a CD. Therefore, as shown in the block diagram of a circuit for playing back the R-DAT tape in FIG. 13, when auto-playing data is to be stored, absolute time data (or running time data) can be written in an auto-playing memory together with program No. data. Note that the R-DAT is also standardized to record TOC data like in a CD. When TOC data is recorded, a music piece can be selected based on the TOC data in an auto-play mode. For a tape on which no TOC data is recorded, after a desired position of a music piece is searched based on absolute time data, and a start position of the music piece is then searched while rewinding the tape, the tape can be played back. The start position of a music piece can be realized by detecting a silent portion between adjacent two music pieces or by detecting a control signal recorded at the beginning of a music piece. In particular, since the R-DAT is standardized to record an ID code as a control signal, the ID code can be used.

with the above method, the present invention can be applied to a compact cassette tape or a VCR tape having no subcodes. When a compact cassette tape is used, a tape counter value from the leading end of the tape can be used as data corresponding to absolute time data. When a VCR tape is used, control pulses recorded on a control track can be counted, so that the count value from the leading end of the tape can be used as data corresponding to absolute time data.

As an instrument to be automatically played, an electronic keyboard instrument has been exemplified in the above embodiment. When the present invention is embodied, it is not limited to the electronic musical instrument. For example, the present invention is applicable to an electronic wind instrument, an electronic guitar, and the like, which do not use keyboards.

An instrument to be automatically played is not limited to an electronic musical instrument. For example, in a conventional acoustic instrument, e.g., in an acoustic piano, performance data such as pitch data, velocity data, and the like are output using sensors, and keys can be depressed using plunger solenoids according to the output data. Thus, a piano part can be automatically played in synchronism with a "minus-one" CD, and a piano concerto, for example, can be played like an actual performance.

What is claimed is:

1. An auto-playing apparatus comprising:

input means for inputting auto-playing data;

memory means, connected to said input means, for storing the auto-playing data input by said input means;

auto-playing means, connected to said memory means, for reading out the auto-playing data from said memory means to sequentially generate corresponding musical tone signals, and for performing an auto-playing operation;

setting means for setting a storage mode for storing the auto-playing data in said memory means;

instruction means for instructing a start of an auto-playing operation;

a recording medium for recording performance data;

reproduction means, connected to said recording medium, for reproducing the performance data from said recording medium;

detection means, connected to said reproduction means, for detecting position data associated with a present reproduction position of said recording medium which is being reproduced by said reproduction means;

control means, connected to said auto-playing means, to said reproduction means, and to said detection means, for executing (i) a control operation for, when the storage mode is set by said setting means, fetching the position data associated with the present reproduction position of said recording medium when input of the auto-playing data is started at said input means from said detection means, and causing said memory means to store the position data, (ii) a control operation for, when the storage mode is set by said setting means, causing said memory means to store auto-playing data sequentially input by said input means, (iii) a control operation for, when said instruction means instructs to start the auto-playing operation, reading out the position data from said memory means, starting reproduction of said recording medium, comparing the readout position data with present position data of said recording medium which is detected by said detection means, sequentially reading out the auto-playing data from said memory means when a coincidence between the two data is detected, and causing said auto-playing means to start the auto-play operation.

2. An apparatus according to claim 1, wherein:

said recording medium records the position data together with the performance data, said reproduction means reproduces the position data together with the performance data, and said detection means detects position data associated with the present reproduction position of said recording medium on the basis of the position data reproduced by said reproduction means.

3. An apparatus according to claim 2, wherein said recording medium has an area for recording subcodes in addition to a main area for storing audio data, and the position data is recorded as the subcodes.

4. An apparatus according to claim 2, wherein said recording medium comprises a compact disk, and the position data is time data recorded by control bits Q of the subcodes.

5. An apparatus according to claim 2, wherein said recording medium comprises a magnetic tape of a rotary head type digital audio tape recorder, and the position data is time data recorded by the subcodes.

6. An apparatus according to claim 1, wherein said detection means measures a time from when reproduction of said recording medium is started by said reproduction means until input of the auto-playing data is started by said input means, and detects the measured time data as position data associated with the present reproduction position of said recording medium.

7. An auto-playing apparatus comprising:

input means for inputting auto-playing data;

memory means, connected to said input means, for storing the auto-playing data input by said input means;

auto-playing means, connected to said memory means, for reading out the auto-playing data from said memory means to sequentially generate corresponding musical tone signals, thereby performing an auto-play operation;

setting means for setting a storage mode for storing the auto-playing data in said memory means;

instruction means for instructing a start of an auto-playing operation; p1 a recording medium for recording performance data for a plurality of program pieces;

reproduction means, connected to said recording medium, for reproducing the performance data from said recording medium;

detection means, connected to said reproduction means, for detecting position data associated with a present reproduction position of said recording medium which is being reproduced by said reproduction means and for detecting program number data of a program piece which is being reproduced;

control means, connected to said auto-playing means, to said reproduction means, and to said detection means, for executing (i) a control operation for, when the storage mode is set by said setting means, fetching the position data associated with the present reproduction position of said recording medium when input of the auto-playing data is started at said input means from said detection means, and causing said memory means to store the position data and the program number data of a program piece which is being reproduced, (ii) a control operation for, when the storage mode is set by said setting means, causing said memory means to store auto-playing data sequentially input by said input means, (iii) a control operation for, when said instruction means instructs to start the auto-playing operation, reading out the position data and the program number data from said memory means, starting reproduction of said recording medium from the beginning of a program piece corresponding to the readout program number data, comparing the readout position data with present position data of said recording medium which is detected by said detection means, sequentially reading out the auto-playing data from said memory means when a coincidence between the two data is detected, and causing said auto-playing means to start the auto-playing operation.

8. An apparatus according to claim 7, wherein:

said recording medium records the position data and the program number data together with the performance data, said reproduction means reproduces the position data and the program number data together with the performance data, and said detection means detects position data associated with the present reproduction position of said recording medium on the basis of the position data reproduced by said reproduction means, and detects program number data of a program piece, which is being reproduced, of said recording medium on the basis of the reproduced program number data.

9. An apparatus according to claim 8, wherein said recording medium has an area for recording subcodes in addition to a main area for storing performance data, and the position data and the program number data are recorded as the subcodes.

10. An apparatus according to claim 9, wherein said recording medium comprises a compact disk, the position data is time data recorded by control bits Q of the subcodes, and the program number data is track number data recorded by the control bits Q of the subcodes.

11. An apparatus according to claim 8, wherein said recording medium comprises a magnetic tape of a rotary head type digital audio tape recorder, and the position and program number data are recorded by the subcodes.

* * * * *

UNITED STATES PATENT AND TRADEMARK OFFICE

CERTIFICATE OF CORRECTION

PATENT NO. : 5,299,181

DATED : March 29, 1994

INVENTOR(S) : KOGUCHI

It is certified that error appears in the above-indentified patent and that said Letters Patent is hereby corrected as shown below:

Title page, Item [57] ABSTRACT, line 5 after "medium", insert "."; "pro-" should be -- Pro- --

Column 13, line 13, delete "pl";

"a recording medium for re-" should start on line 14 as a new paragraph.

Signed and Sealed this

Thirtieth Day of January, 1996

Attest:

BRUCE LEHMAN

Attesting Officer

Commissioner of Patents and Trademarks